DUTY MODULATION CONTROL CIRCUIT FOR A FIELD-EFFECT TUBE

Filed Feb. 26, 1968

INVENTOR.
LUIS A. RIESCO

BY

Frank R. Trifari

AGENT

United States Patent Office 3,497,795
Patented Feb. 24, 1970

3,497,795

DUTY MODULATION CONTROL CIRCUIT FOR A FIELD-EFFECT TUBE

Luis A. Riesco, East Northport, N.Y., assignor, by mesne assignments, to U.S. Philips Corporation, New York, N.Y., a corporation of Delaware Filed Feb. 26, 1968, Ser. No. 708,019
Int. Cl. G05f *1/40*
U.S. Cl. 323—22 9 Claims

ABSTRACT OF THE DISCLOSURE

A duty cycle modulated supply using a current-controlled pulse shaping circuit to adjust the width of output pulses from a fixed frequency pulse generator. The resultant constant-frequency, variable-width signal pulses control an electronic switch which alternately forward and reverse biases an output power oscillator.

The invention relates to control circuits for varying the average power into a controlled device by duty cycle moduation.

In many applications it is extremely advantageous to control the average power output of a device by maintaining the peak power constant and varying the time intervals during which power flows. In oscillators using field-effect tubes duty cycle moduation is one of the few possible power controlling methods which insures stability over the entire range of control.

The theory of a field-effect tube will be found in copending application Ser. No. 534,308, filed Mar. 15, 1966, now U.S. Patent No. 3,366,823 which is a continuation of application Ser. No. 485,259, filed July 27, 1964, and copending application Ser. No. 452,063, filed Apr. 30, 1965, all assigned to the assignee of the present invention.

Conventional methods of duty cycle modulation may be divided into those operating in conjunction with external alternating voltage sources and those in which the basic output frequency is self-generated. The former type generally employs a controlled source of direct voltage and a source of alternating voltage having a fixed frequency and amplitude. By measuring the relative amplitudes of the two sources an electronic comparator controls the output of the device as a function of the width of that portion of the cycle during which the alternating voltage exceeds the direct voltage. Although this type is basically a fixed frequency device, the width of its output waveform is sensitive to changes in the amplitude of the alternating voltage. In duty cycle modulated devices where the output frequency is internally generated, changes in the output pulse widths are generally produced by changing bias levels within the internal oscillator, or by changing the values of circuit elements within the oscillator. Although effective in changing the duty cycle these practices also have the undesirable effect of altering the output frequency of the device.

It is a principal object of the invention to produce an improved duty-cycle modulation device. It is a further object to produce a duty-cycle modulation device having an output frequency which remains fixed as the duty cycle is varied. Another object is to provide a duty-cycle modulation device having a pulse width which is unaffected by changes in the amplitude of the frequency determining signal. Other objects will become apparent from the descriptive material in the remainder of the specification.

These objects are accomplished by employing a fixed frequency pulse source in a circuit which operates independently of the pulse amplitude thereof. The pulse source may be any known type of free-running pulse oscillator circuit, such as a multivibrator, for providing a series of pulses having a narrow width and a fixed frequency. The pulses are used to periodically discharge an energy storage device, such as a capacitor. The storage device is charged through an adjustable current source. A threshold switch connected to the energy storage device turns on a power source in response to current accumulations in the storage device rising above a threshold level, and turns the power source off each time a pulse from the pulse source discharges the storage device to an accumulation below the fixed level. If, after the storage device is discharged, it is rapidly charged by the adjustable current source the threshold switch will turn on the power source for a major portion of the time between discharging pulses. On the other hand, where the adjustable current source charges the energy storage device slowly the threshold level will not be reached as fast and the threshold switch will turn on the power source for only a short period of time before the next successive discharge pulse turns the power source off. Duty-cycle modulation is thereby produced.

A preferred embodiment of the invention will be explained with reference to the following drawing by way of example only, in which.

Figures 1, 2:
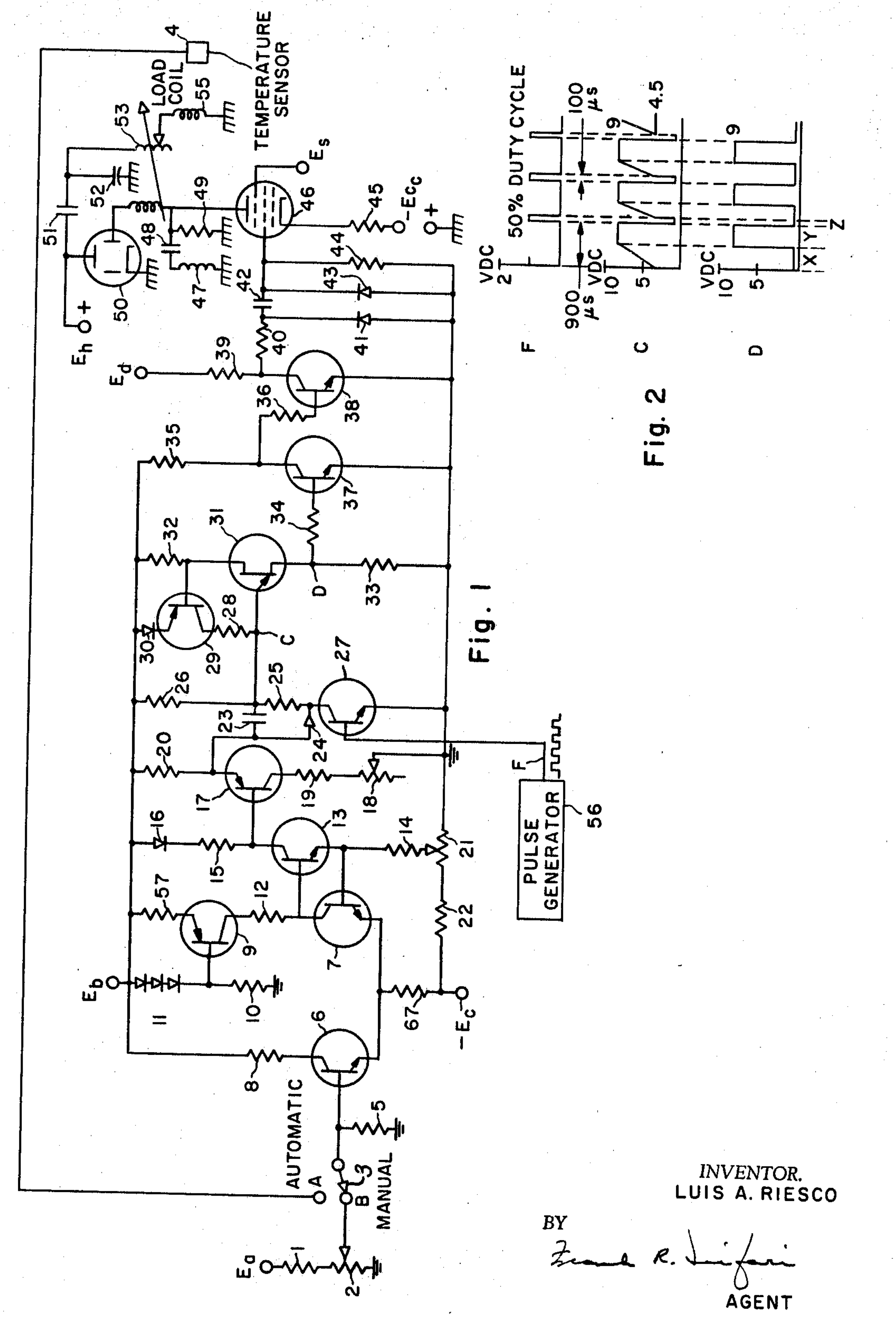
FIG. 1 is a schematic diagram of a preferred embodiment of the invention.
FIG. 2 is a set of plots showing the voltage variations of three identified points in the device of FIG. 1.

A supply voltage E*a* is coupled to resistor 1 and potentiometer 2. With switch 3 in position B a selectable fraction of voltage E*a* is coupled to resistor 5 causing a current to flow into the base of transistor 6. Transistors 6 and 7 form a differential amplifier. The emitter terminals of transistors 6 and 7 are coupled through resistor 67 to negative voltage source —E*c*. A collector resistor 8 is provided between voltage source E*b* and the collector terminal of transistor 6. Diodes 11 and resistor 10 are connected in series with source E*b*. The junction of resistor 10 and diodes 11 is connected to the base terminal of transistor 9 to provide a constant current reference source for differential amplifier 6, 7. The reference current is conducted from source E*b* through resistors 12 and 57 and the collector-emitter terminals of transistor 9 to the collector terminal of transistor 7. The output of differential amplifier 6, 7 is coupled from the collector terminal of transistor 7 to the base terminal of transistor 13. To provide linearizing negative feedback for decreasing the current sensitivity of the differential amplifier 6, 7 the emitter of transistor 13 is coupled to the series combination of potentiometer 21 and resistors 14 and 22, and to the base terminal of transistor 7. Collector bias for transistor 13 is provided by supply voltage E*b* trhough diode 16 and resistor 15. The collector of transistor 13 is connected to the base of transistor 17 which is wired as an emitter-follower amplifier. Resistor 19 and potentiometer 18 are coupled in series with the collector of transistor 17 to limit the maximum current through the transistor. Resistor 20 is coupled to the emitter of transistor 17 as the output resistor of the emitter follower 17. The emitter terminal of transistor 17 is coupled to one side of a timing capacitor 23 to provide a controlled charge path for the capacitor. The minimum charge rate of the timing capacitor 23 is determined by the setting of potentiometer 21. A resistor 26 connects the other side of capacitor 23 to voltage source E*b*, thereby completing the charging circuit. The output terminal F of a pulse generator 56 is coupled to the base of a switching transistor 27. The pulse generator may be any standard form of astable multivibrator or the like. The collector of transistor 27 is connected to one side of capacitor 23 through diode 24 and to the other side of capacitor 23 through resistor 25, to provide a discharge path for each side of capacitor 23 each time transistor 27 receives a pulse from pulse generator 56. The junction of capacitor 23 and resistor 26 is coupled to the emitter of unijunction transistor 31 to control the transistor's firing time. Resistor 32 is connected to the input base of unijunction transistor 31 and to the base of a transistor 29. The emitter of transistor 29 is connected to supply voltage E*b* through forward-biased diode 30. Resistor 28 connects the collector of transistor 29 to the emitter of unijunction transistor 31 to assure saturation during those periods when transistor 31 is conductive. The output base of transistor 31 is coupled to resistor 33 and to the base terminal of transistor 37 through resistor 34 to amplify the output signals of transistor 31. The collector of transistor 37 is connected to resistor 35 and coupled to the base terminal of transistor 38 through resistor 36 to further amplify the signals from transistor 31. The output terminal of transistor 38 is coupled to a voltage source E*d* (not shown) through resistor 39 and to series connected resistor 40 and diode 41. Capacitor 42 couples the junction of resistor 40 and diode 41 to the control grid of pentode 46 and to the parallel combination of diode 43 and resistor 44. The cathode and suppressor grid of pentode 46 are coupled to voltage source —E*cc* (not shown) through resistor 45. The screen grid of the pentode is connected to voltage source E*s* (not shown). The plate of pentode 46 is coupled to the gate terminal of a field-effect tube through the feedback coil, secondary of transformer 53. The plate of the pentode is also coupled to gate leak resistor 49 to maintain a proper gate bias, and to a series resonant trap consisting of condenser 48 and coil 47 to prevent high frequency signals from passing through the pentode. Output signals from the collector terminal of the field-effect tube are coupled through capacitor 51 to a tuned circuit consisting of capacitor 52 in parallel with the series combination of the tank coil primary winding of transformer 53 and the load coil 55. The tuned circuit is in turn regeneratively coupled to the gate electrode of the field-effect tube 50 through transformer 53 to sustain oscillations. A high voltage source E*h* (not shown) is connected to the collector terminal of the field-effect tube to supply collector voltage.

Referring to FIG. 1, the current which controls the output of the device passes through switch 3. If this switch is set to contact A the control current is produced by temperature sensor 4. With the switch set to contact B the control current is determined by the setting of potentiometer 2. The constant current generator, consisting of transistor 9 and its associated diodes and resistors provides a reference input current for differential amplifier 6, 7. The control current from switch 3 provides the signal input for the differential amplifier. Transistor 13 amplifies the output of the differential amplifiers and provides negative feedback through the base terminal of transistor 7 for reducing the current sensitivity and linearizing the characteristics of the differential amplifier. The output signal of the collector of transistor 13 controls the rate at which capacitor 23 is charged through transistor 17. Potentiometer 18 sets the maximum current through transistor 17 and therefore determines the maximum charging rate of capacitor 23. Potentiometer 21, on the other hand, controls the quiescent bias of transistor 7, which in turn controls the quiescent current through transistor 13 and 17, thereby determining the minimum charge rate of capacitor 23. Narrow, positive-going pulses from pulse generator 56 periodically discharge capacitor 23 through transistor 27, turning off transistor 31. When capacitor 23 charges to the threshold level or firing voltage of unijunction transistor 31 current flows through resistor 32 and forward biases transistor 29. The current through transistor 29 keeps transistor 31 forward biased until a positive-going pulse from pulse generator 56 removes the charge from the capacitor 23 and turns off the unijunction transistor.

This operation may be more readily understood with reference to FIG. 2. During time interval X as shown in FIG. 2 capacitor 23 charges toward the firing voltage of unijunction transistor 31 through resistors 18, 19 and 26 and transistor 17 at a rate controlled by the current flowing through the base of transistor 17. When the capacitor 23 attains a voltage equal to the breakdown voltage of transistor 31, this transistor conducts causing a sudden rise in potential cross resistor 32 which forward biases transistor 29. The current flowing through transistor 29 quickly saturates the unijunction transistor 31 and maintains this saturation condition during the time period Y as shown in FIG. 2. The next pulse from the pulse generator 56 saturates normally reverse biased transistor 27, thereby discharging capacitor 23 and dropping the voltage on the emitter of transistor 31 below the level necessary to sustain current through the base terminals thereof. The cessation of current through transistor 31 removes the forward bias from transistor 29 and lowers the voltage at point D. This occurs during time period Z as shown in FIG. 2. When the output of pulse generator 56 returns to its quiescent valve transistors 27 is reverse-biased and capacitor 23 again starts charging towards the breakdown voltage of unijunction transistor 31. By adjusting the charging rate of capacitor 23 the interval between a pulse from pulse generator 56 and the firing of unijunction transistor 31 is controlled. The resultant pulse width modulated signal from the output terminal D of unijunction transistor 31 is amplified by transistors 37 and 38 and coupled by capacitor 42 to pentode 46. The pentode is wired to function as a switch which enables the field-effect tube oscillator 50 to oscillate during conduction intervals of unijunction transistor 31. The oscillations cause heat to be generated in the load coil 55. When switch 3 is set to its "automatic" position the current produced by the temperature sensor 4 controls the duty cycle of the oscillator output and thereby regulates the temperature of the load coil 55.

What is claimed is:

1. A duty-cycle regulated power supply assembly which comprises an adjustable current source for providing controllable magnitudes of electric current, energy storage means connected to said source for accumulating said current from said source at a rate controlled by the magnitude of said current from said source, a threshold switch connected to said storage device for providing a switching signal in response to current accumulations in said storage device above a threshold level, a pulse generator for periodically generating pulses, the time between said pulses constituting a full cycle, a pulse operable switch connected to said storage means and said pulse generator for discharging said storage means to a current accumulation below said threshold level in response to each pulse of said pulse generator, thereby turning off said switching signal from said threshold switch with each said pulse from said pulse generator, the duration of said switching signal from said threshold switch thereby variable as a function of the magnitude of said current from said adjustable current source, and a power source connected to said threshold switch for providing output power from said regulated power supply in response to said signal from said threshold switch, said duration of said switching signal and said output power within a complete cycle constituting said duty cycle of said power supply.

2. A power supply as claimed in claim 1 including power sensing means coupling said power source to said adjustable current signal source for sensing the power output of said power source and for adjusting the output of said control signal source as a function of said power output.

3. A device as claimed in claim 2 wherein said current source comprises a differential amplifier having an output terminal and at least two input terminals, said output terminal being the output terminal of said current source, one of said input terminals being the input terminal of said current source, and a reference current source coupled to the other input terminal of said differential amplifier.

4. A power supply as claimed in claim 1 wherein said current source comprises a differential amplifier having an output terminal and at least two input terminals, said output terminal being the output terminal of said current source, one of said input terminals being the input terminal of said current source and a reference current source coupled to a second input terminal of said differential amplifier.

5. A power supply as claimed in claim 1, wherein said threshold switch comprises a unijunction transistor having input, and output terminals, a further transistor and means for regeneratively coupling said further transistor to the input terminal of said unijunction transistor, said input terminal of said unijunction transistor connected to said storage device, said output terminal of said unijunction transistor connected to said power source.

6. A power supply as claimed in claim 5 wherein said power source comprises a field-effect tube having input and output electrodes, a tuned circuit coupled to said output electrodes for producing oscillations in response to said switching signal from said threshold switch and means for regeneratively coupling said output and input electrodes to sustain said oscillations.

7. A duty-cycle regulated power supply, which comprises a field-effect tube having input and output terminals, a tuned circuit coupled to said output terminals for producing oscillations, means for regeneratively coupling said input and output terminals to sustain oscillations, first amplifier means having input and output terminals, said output terminal of said first amplifier means coupled to the input terminal of said field-effect tube for biasing said tube to alternately promote and inhibit oscillations in response to signals on the input terminal of said amplifier, a unijunction transistor having input, output and common electrodes, said output terminal producing a first output signal in response to voltage levels on said input terminal which fall below a threshold level and producing a second output signal in response to voltage levels on said input terminal which rise above said threshold level, means for coupling the output terminal of said unijunction transistor to the input terminal of said first amplifier means to cause said amplifier means to promote oscillations in said field-effect tube in response to said first output signal and to inhibit oscillations in response to said second output signal, a further transistor regeneratively coupling the input and common terminals of said unijunction transistor, a capacitor coupled to the input terminal of said unijunction transistor, a first current source having input and output terminals, said output terminal producing current as a function of signals on said input terminal, means for coupling the output terminal of said current source to said capacitor to charge said capacitor at a controlled rate toward the predetermined switching level of said first switching device, a transistor switch having input, output and common terminals, said output-common terminal path exhibiting an impedance change in response to a pulse on said input terminal, means for coupling the output-common terminal path to said capacitor for discharging said capacitor in response to a pulse on the input terminal of said switching transistor, a differential amplifier having an output terminal and at least two input terminals, a reference-current source coupled to an input terminal of said differential amplifier, means for coupling the output terminal of said differential amplifier to the input terminal of said first current source and control means for supplying a current to a further input terminal of said differential amplifier, whereby said current controls the charge rate of said capacitor through said differential amplifier and said first current source.

8. A device as claimed in claim 7 wherein said control means comprises a load coupled to the output terminal of said field-effect tube, a thermo-electric transducer near said load having an output terminal for producing a current as a function of the temperature of said load, and means for coupling the output of said transducer to the input terminal of said differential amplifier.

9. A device as claimed in claim 7 wherein said control means comprises a voltage source and a variable resistor coupling said voltage source and the input terminal of said differential amplifier.

References Cited

UNITED STATES PATENTS 3,323,037 5/1967 Doss.
3,389,328 6/1968 Janson ------------ 323—38 X LEE T. HIX, Primary Examiner G. GOLDBERG, Assistant Examiner U.S. Cl. X.R.

307—246, 265, 297; 315—162; 323—31, 38